United States Patent [19]
Anderson

[11] Patent Number: 5,239,769
[45] Date of Patent: Aug. 31, 1993

[54] AUTOMATIC DROP-BACK FISHING LINE RELEASE

[76] Inventor: Drew R. Anderson, 100 Cannon Trail, Mantieo, N.C. 27954

[21] Appl. No.: 845,964

[22] Filed: Mar. 4, 1992

[51] Int. Cl.⁵ .............................................. A01K 91/00
[52] U.S. Cl. .................................................. 43/43.11
[58] Field of Search .................... 43/43.11, 27.2, 27.4, 43/43.12

[56] References Cited

U.S. PATENT DOCUMENTS

| | | | |
|---|---|---|---|
| 522,503 | 7/1894 | De Bern | 43/27.4 |
| 2,864,199 | 12/1958 | Vollten | 43/43.11 |
| 3,136,086 | 6/1964 | Morrison | 43/43.11 |
| 3,500,575 | 3/1970 | Klemkowski | 43/43.11 |
| 3,629,966 | 12/1971 | Sanchez | 43/43.11 |
| 3,892,083 | 7/1975 | Peterson | 43/43.11 |
| 3,930,330 | 1/1976 | Black | 43/43.12 |

Primary Examiner—Kurt C. Rowan
Attorney, Agent, or Firm—S. Michael Bender

[57] ABSTRACT

A fishing line holding spool is designed to be mounted in a fishing rod holder on a boat and retains a length of fishing line between a fishing rod and a line release clip positioned below the spool. When a fish strikes the bait, the line is released from the clip and the additional fishing line automatically comes off the spool so as to allow the fish to eat the bait before the line becomes taunt. The device is designed to prevent the premature setting of a fish hook before a fish has adequately swallowed the bait. An audible signal may also be utilized to indicate that a fish has struck the line. In a modified embodiment of the invention, the line holding spool is mounted in a stationary manner to a support pole and a lever-adjusted clamping device is utilized to position the spool in any desired angular relationship relative to the support pole. A tension adjustable line clip is attachable to the support pole and facilitates the preselecting of release pressure for the line in response to a fish striking the bait.

5 Claims, 6 Drawing Sheets

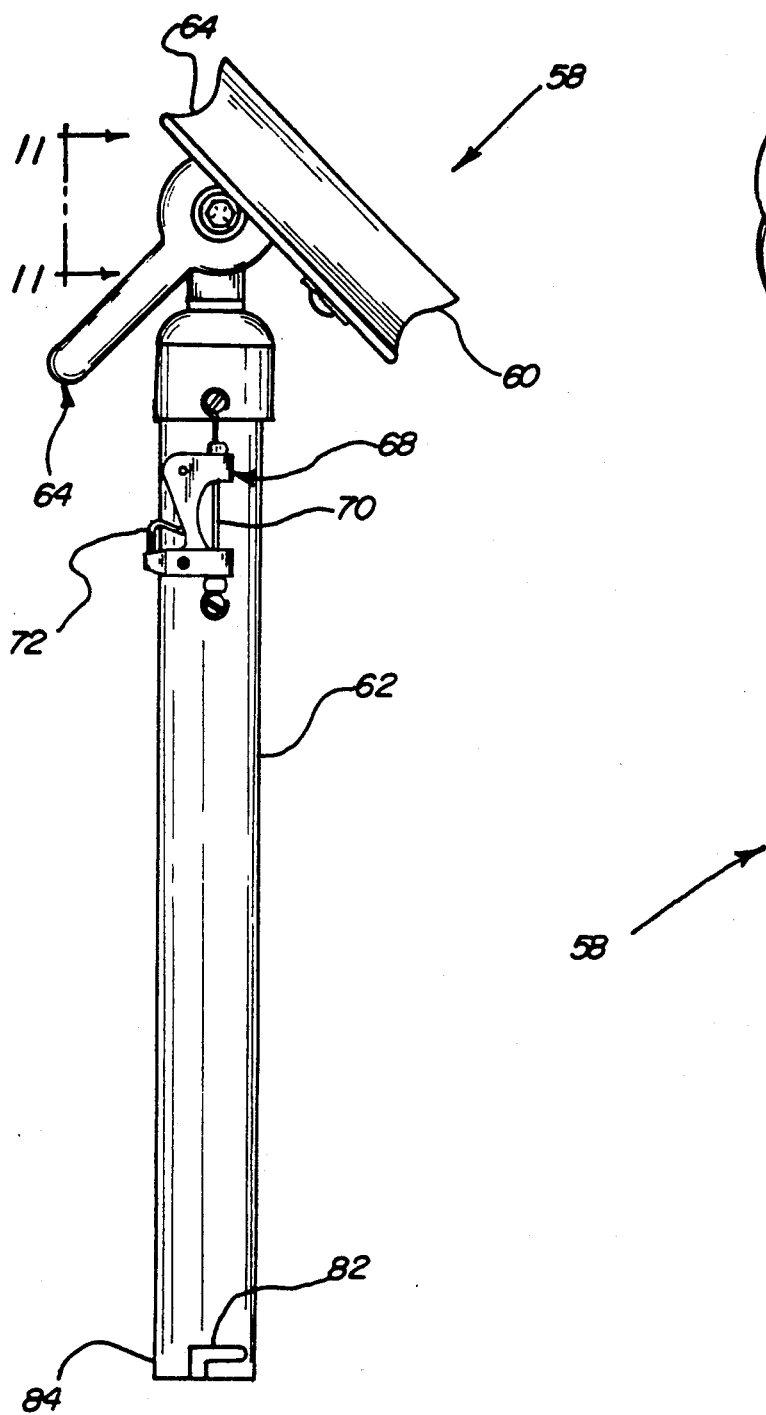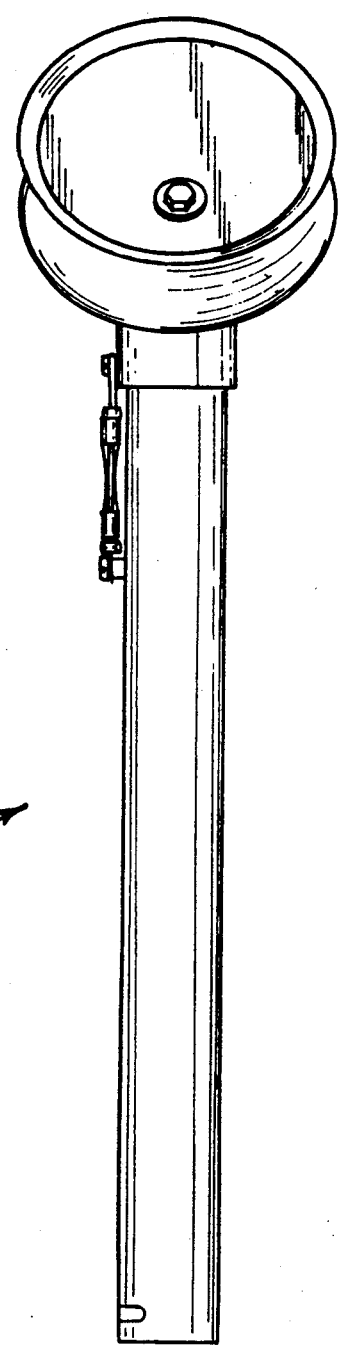

AUTOMATIC DROP-BACK FISHING LINE RELEASE

BACKGROUND OF THE INVENTION

1. Field of the Invention

The present invention relates to fishing devices and more particularly pertains to an automatic line release associated with a fishing rod.

2. Description of the Prior Art

The technique of allowing a fish to run with a bait before tightening a fishing line is well known in the prior art. Typically, this method of catching a fish is accomplished by allowing line to feed freely from a fishing reel while the fish is moving with the bait, and it requires the attention of the angler to determine when a fish has taken the bait and subsequently when to tighten the line so as to set the hook. While being a very effective technique for catching fish, it can be appreciated that there is some attendant inconvenience inasmuch as an angler must be constantly attentive as to whether or not a fish has taken the bait. As such, there appears to be a continuing need for new and improved devices which would allow a fish to run with a fishing line before a hook is set wherein such devices would not require the constant attention of an angler. In this respect, the present invention substantially fulfills this need.

SUMMARY OF THE INVENTION

In view of the foregoing disadvantages inherent in the known types of automatic fishing line releasers now present in the prior art, the present invention provides an improved automatic fishing line releaser construction wherein the same can be utilized without the necessity of constant attention by an angler. As such, the general purpose of the present invention, which will be described subsequently in greater detail, is to provide a new and improved automatic fishing line releaser which has all the advantages of the prior art automatic fishing line releases and none of the disadvantages.

To attain this, the present invention essentially comprises a fishing line holding spool is designed to be mounted in a fishing rod holder on a boat and retains a length of fishing line between a fishing rod and a line release clip positioned below the spool. When a fish strikes the bait, the line is released from the clip and the additional fishing line automatically comes off the spool so as to allow the fish to eat the bait before the line becomes taunt. The device is designed to prevent the premature setting of a fish hook before a fish has adequately swallowed the bait. An audible signal may also be utilized to indicate that a fish has struck the line. In a modified embodiment of the invention, the line holding spool is mounted in a stationary manner to a support pole and a lever-adjusted clamping device is utilized to position the spool in any desired angular relationship relative to the support pole. A tension adjustable line clip is attachable to the support pole and facilitates the preselecting of release pressure for the line in response to a fish striking the bait.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purpose of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automatic fishing line releaser which has all the advantages of the prior art automatic fishing line releasers and none of the disadvantages.

It is another object of the present invention to provide a new and improved automatic fishing line releaser which may be easily and efficiently manufactured and marketed.

It is a further object of the present invention to provide a new and improved automatic fishing line releaser which is of a durable and reliable construction.

An even further object of the present invention is to provide a new and improved automatic fishing line releaser which is susceptible of a low cost of manufacture with regard to both materials and labor, and which accordingly is then susceptible of low prices of sale to the consuming public, thereby making such automatic fishing line releasers economically available to the buying public.

Still yet another object of the present invention is to provide a new and improved automatic fishing line releaser which provides in the apparatuses and methods of the prior art some of the advantages thereof, while simultaneously overcoming some of the disadvantages normally associated therewith.

Still another object of the present invention is to provide a new and improved automatic fishing line releaser which is operable without the necessity of constant attention by an angler.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is a side elevation view of a second embodiment of the invention.

FIG. 10 is a front elevation view of the second embodiment.

DESCRIPTION OF THE PREFERRED EMBODIMENTS

Figure 1:
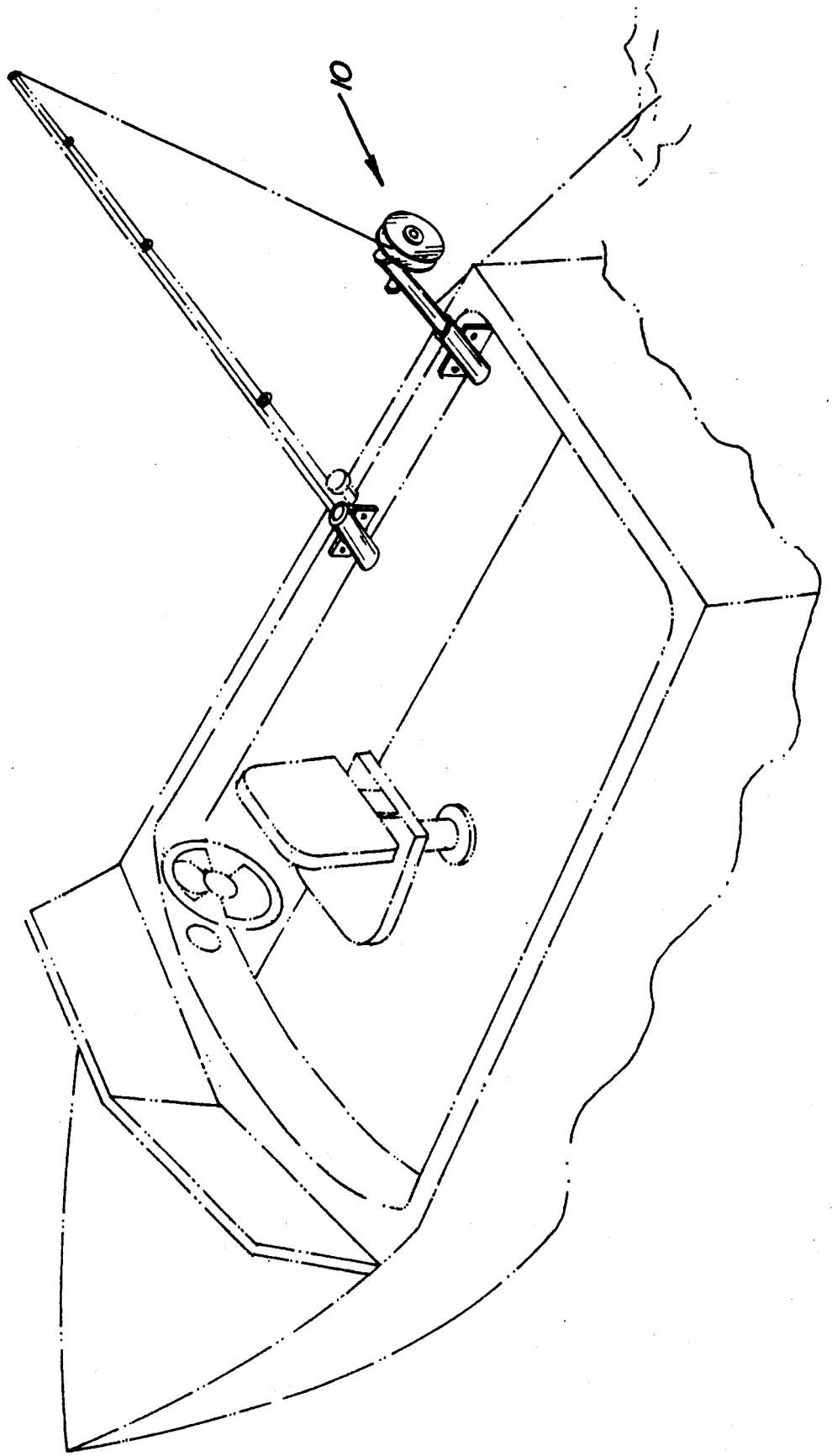
FIG. 1 is a perspective view of the invention showing it in operation.
Figure 2:
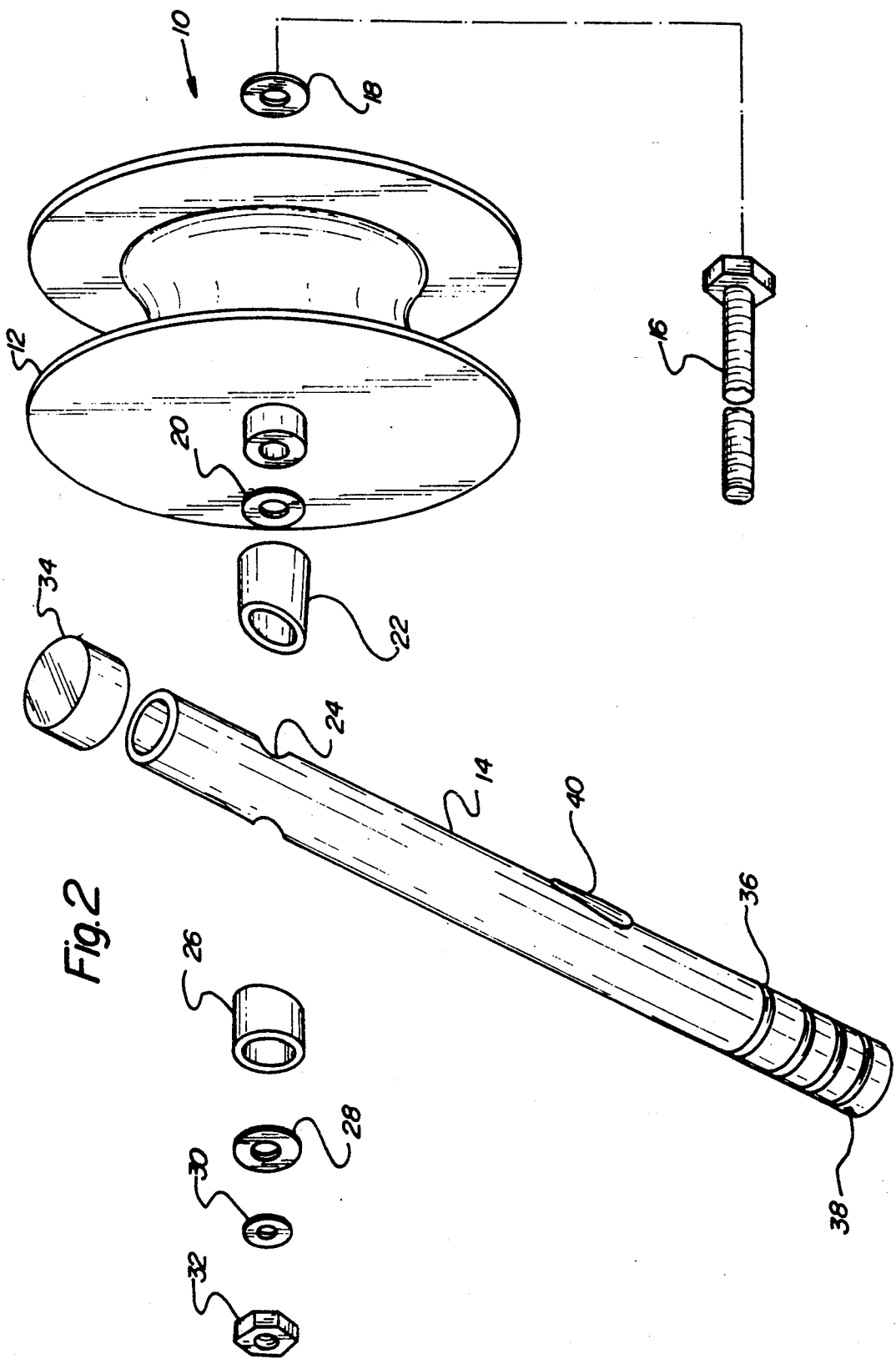
FIG. 2 is an exploded perspective view of the invention.
Figure 3:
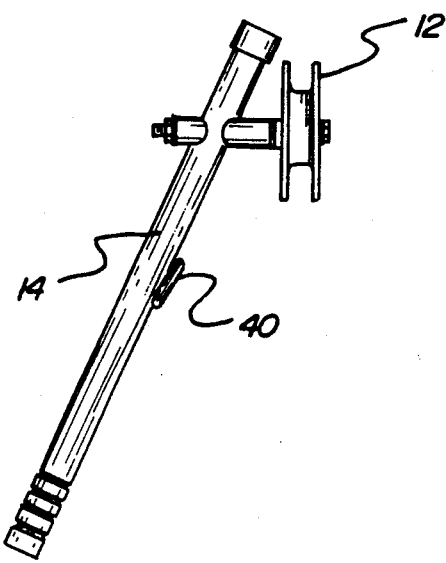
FIG. 3 is a side elevation view of the invention.
Figure 4:
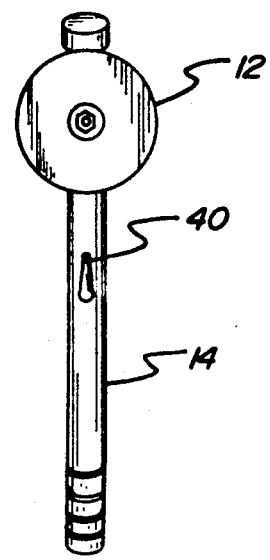
FIG. 4 is a front elevation of the invention.
Figure 5:
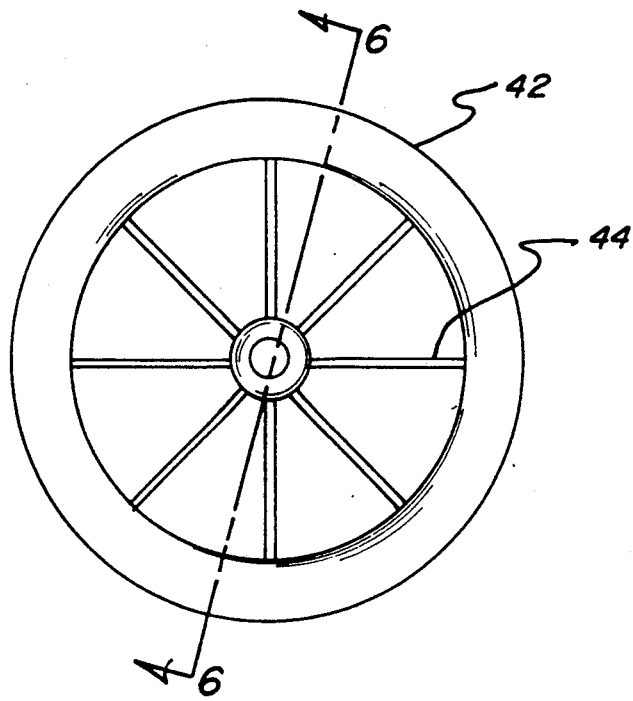
FIG. 5 is a side elevation view of the spool associated with the invention.
Figure 6:
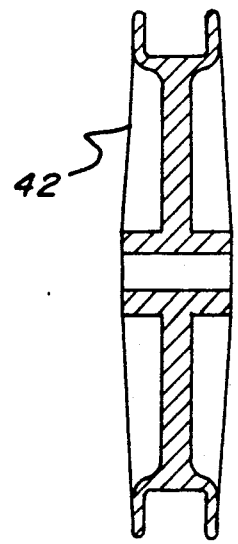
FIG. 6 is a cross-sectional view of the spool as viewed along the line 6—6 in FIG. 5.
Figure 7:
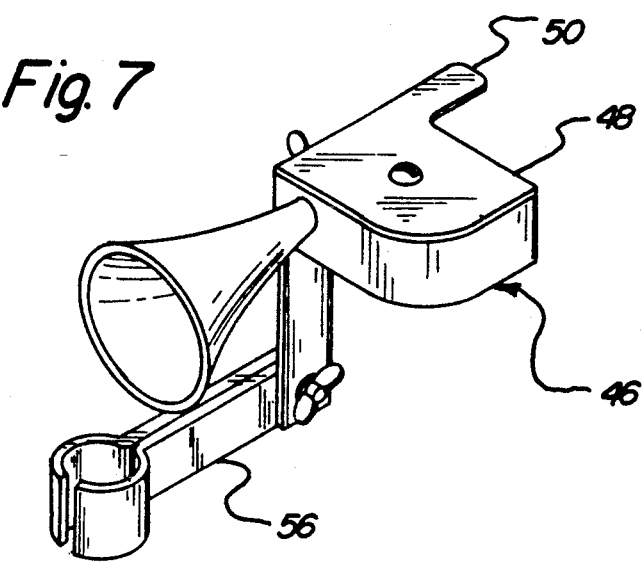
FIG. 7 is a perspective view of an audible signal device utilizable with the invention.

With reference now to the drawings, and in particular to FIGS. 1-6 thereof, first embodiment of a new and improved automatic fishing line releaser embodying the principles and concepts of the present invention and generally designated by the reference numeral 10 will be described.

As shown, the automatic line releaser 10 essentially consists of a rotatable line-holding spool 12 which is attachable to an upstanding section of PVC tubing 14. This attachment is facilitated by the use of a threaded fastener 16 which is positionable through a washer 18, and then through the spool 12. The fastener 16 continues on through a second washer 20, a spacing sleeve 22, a through-extending aperture 24 formed in the tube 14, and a second spacer 26. A flat washer 28, a lock washer 30, and a nut 32 are then utilized to attach the bolt 16 to the entire assembly 10. Through the use of the lock washer 30, the bolt 16 need not be tightened too securely whereby the spool 12 may freely rotate on the bolt with the bolt acting as the supporting shaft. To complete the assembly, the tube 14 may be closed off with a cap 34 and may also be provided with a plurality of circumferentially extending grooves into each of which a rubber O-ring 36 may be frictionally engaged. Additionally, a slot 38 may be cut in the bottom of the tube 14 to facilitate its positioning within a conventional fishing rod holder mounted on a boat with the O-ring 36 then operating to provide frictional support for the assembly 10 once it is positioned in the holder. Finally, a spring clip 40 is positioned at a convenient location along the axial length of the tube 14 with this spring clip being designed to releasably hold a length of fishing line.

In use, the automatic fishing line releaser 10 is inserted in a conventional rod holder on a boat, and a fishing pole is positioned nearby. The line from the fishing pole is fed away from the fishing reel and wrapped around the spool 12 on the releaser 10. After a sufficient length of line has been wrapped around the spool 12, the line is then clipped to the spring clip 40 on the side of the tube 14 with the baited end of the line then being lowered in the water to attract fish. When a fish takes the bait, the fishing line is automatically pulled free from the clip 40 and the spool 12 rotates to continually release line in an undetectable manner to the fish. Once the chosen amount of line has completely left the reel 12, the line will become taunt and the pole may then be utilized to set the hook.

Figure 8:
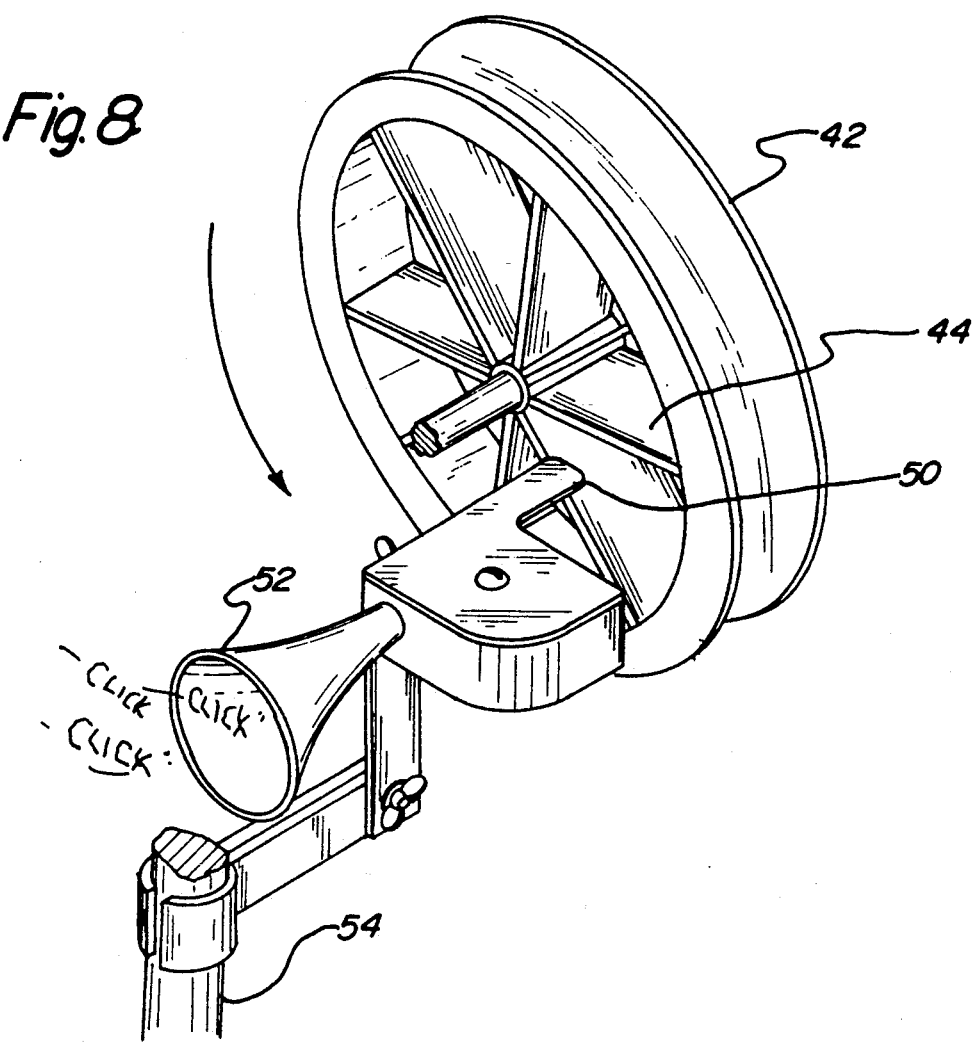
FIG. 8 is a perspective view illustrating the signal device being utilized with the invention.

FIGS. 5-8 illustrate a modified embodiment of the invention wherein a spool 42 is used to replace the spool 12 shown in the embodiment 10. The spool 42 is provided with a plurality of molded spokes 44. An audible signaling device 46 includes a housing 48 from which a thin metal protrusion 50 extends. The metal protrusion 50 is designed to interfere with the spokes 44 as the spool 42 rotates. However, the thin flexible construction of the protrusion 50 results in its flexible movement as the spool continues to rotate without providing any substantial impediment to rotation. As the protrusion 50 flexibly bends and snaps back into place, it emits an audible sound into the hollow housing 48 and this sound is amplified by a horn-like structure 52 to indicate to an angler that the spool 42 is rotating. The signalling device 46 may be attached to a boat railing member 54 by an adjustable clamp assembly 56 as illustrated in FIG. 8.

As to the manner of usage and operation of this first embodiment 10 of the present invention, the same should be apparent from the above description. Accordingly, no further discussion relating to the manner of usage and operation will be provided.

Figure 11:
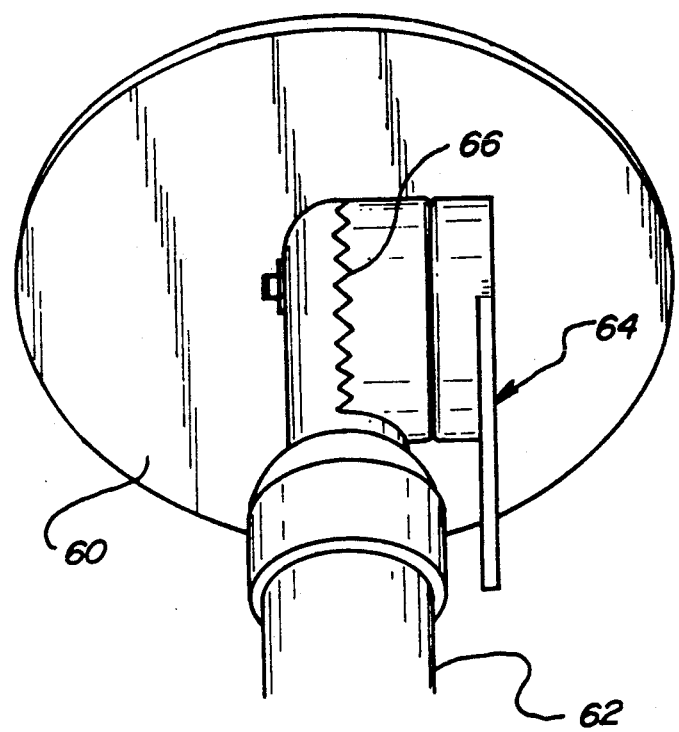
FIG. 11 is a cross-sectional view of the invention as viewed along the line 11—11 in FIG. 9.
Figure 12:
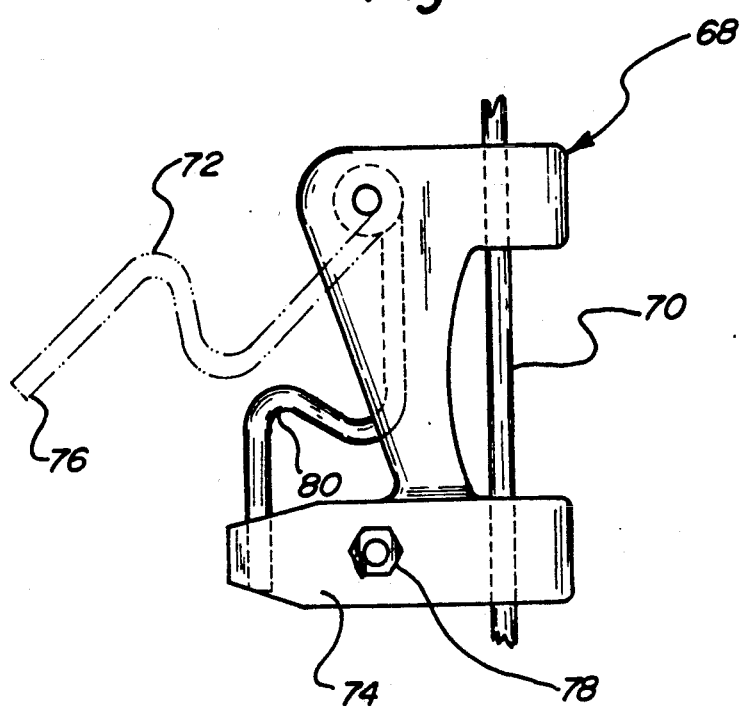
FIG. 12 is an enlarged view of the line clip utilizable with the second embodiment of the invention.

FIGS. 9-12 illustrate a second embodiment of the invention which is generally designated by the reference numeral 58. The second embodiment 58 is substantially similar to the embodiment 10 with several exceptions. For example, a differently shaped spool 60 is designed to be mounted in a stationary manner to a support pole 62 whereby the spool is not designed to rotate as fishing line is dispensed therefrom. Rather the spool 60 is provided with a smooth curvilinearly-shaped line holding trough 64 around which a length of fishing line can be manually wrapped and from which the line will be dispensed in response to a fish strike. The spool 60 is relatively adjustable in relation to the support rod 62 by means of a lever-actuated clamp 64 which is rotatable in a counterclockwise direction to effect a separation of the intermeshing teeth 66 as best shown in FIG. 11, while a clockwise rotation of the lever causes the teeth to mesh together, thus to lock the spool 60 in a selected angular position. More particularly, upon a releasing of the lever-actuated clamp 64, the spool 60 can be pivotally moved to any available angular position in a now apparent manner, thereby to more accurately position a length of fishing line extending outwardly therefrom.

Another noteworthy feature of the embodiment 58 of the invention includes the use of an outrigger fishing line release clip 68 utilizable to releasably secure the fishing line contiguous to the support pole 62. The clip release 68 is attached to the pole 62 by a length of wire 70 secured to the pole and a release arm 72 is frictionaly retained within a body portion 74 of the release clip. The body portion 74 is of a bifurcated design which is designed to receive an end 76 of arm 72, and an adjustable tensioning means 78 determines the extent of frictional engagement of the arm when it is held between the bifurcations formed in the body 74. In the preferred embodiment, the adjustable tensioning means 78 can comprise a threaded thumbscrew and nut arrangement designed to force the bifurcations closer together so as to provide a greater gripping force on the release arm 72. Fishing line is retained between the body portion 74 and an interior looped portion 80 of the arm 72. In response to a fish strike, the fish line will move up into the notch 80 and depending upon the amount of tension on the fishing line, the arm 72 will be pulled away from the bifurcated holding portion of the body 74, thereby to release the fishing line from the clip 68 and allow it to be dispensed from the spool 60 in a now apparent manner.

A final mentionable feature of the embodiment 58 of the invention includes the L-shaped slots 82 cut in a bottom end 84 of the support rod 62. These slots 82 are designed to facilitate a positioning of the invention 58 within a conventional fishing rod holder mounted in a boat wherein each of the pair of slots 82 will receive holding pins formed in the rod holder. The invention 58 can then be manually rotated whereby the pins are retained in the ends of the slots 82, thus to securely lock this embodiment of the invention within the conventional rod holding aperture. The spool 60 can then be pivoted and/or rotated as desired by means of the lever-actuated clamp 64 so as to obtain the desired orientation between a fishing rod and the fishing line release 58.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved automatic fishing line releaser comprising:
   spool means for retaining a selected length of fishing line removed from the reel of a fishing pole;
   support means to which said spool means is rotatably attached, said support means being positionable within a conventional rod holder; and
   line clip means to which said selected length of fishing line is removably attached to prevent said line from becoming disengaged from said spool means, thereby to facilitate a positioning of a baited fishing line within the water and wherein said line is release from said line clip means upon a strike by a fish so as to allow an automatic release of said selected length of fishing line from said spool means prior to said line becoming taut; and
   further including audible signal means; wherein said audible signal means comprises a protrusion engageable with spokes formed on said spool means, said protrusion being flexibly movable in response to a rotation of said spool means to thereby generate an audible sound.

2. The new and improved automatic fishing line releaser as described in claim 1, and further including griping means for facilitating a frictional retention of said automatic fishing line releaser within said rod holer.

3. The new and improved automatic fishing line releaser as described in claim 1, and further wherein said audible signal means includes a horn-like structure for amplifying said sound generated by said protrusion.

4. The new and improved automatic fishing line releaser as described in claim 1 wherein said line clip means comprises a body portion adapted to be supported proximal to said spool means on said support means, a release arm having first and second opposed ends, said first end being pivotally attached to said body member and said second end being frictionally received within a bifurcated portion on said body member, tension adjusting means comprising adjustable means cooperating with said bifurcated portion to vary the frictional engagement thereof with said second end of said release arm.

5. The new and improved automatic fishing line releaser as described in claim 1 further including adjustable clamp means for adjusting and fixing the angular orientation of said spool means relative to said support means.

* * * * *